H. F. GREENUP.
SAFETY SIGNAL FOR AUTOMOBILES.
APPLICATION FILED SEPT. 23, 1915.
1,187,424.
Patented June 13, 1916.
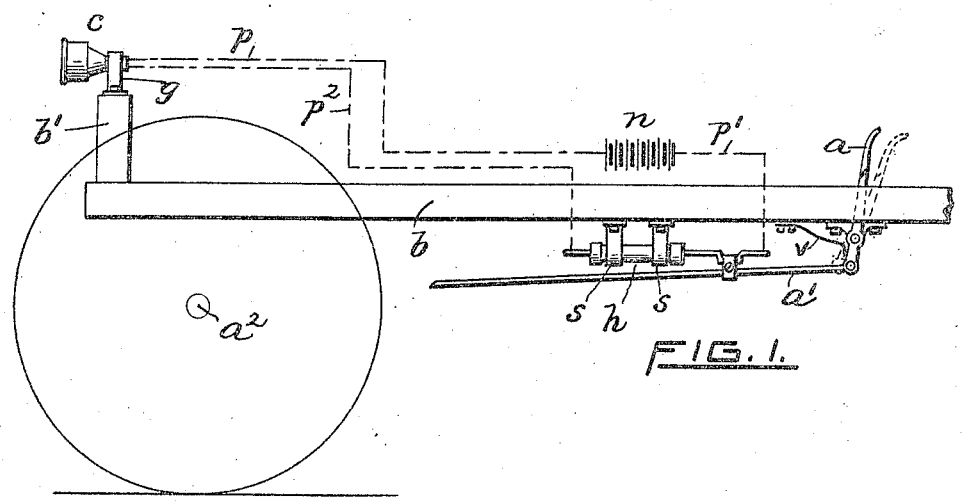
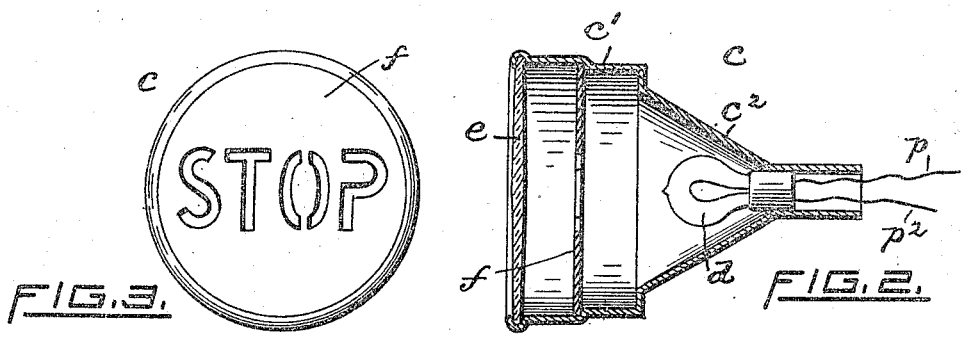
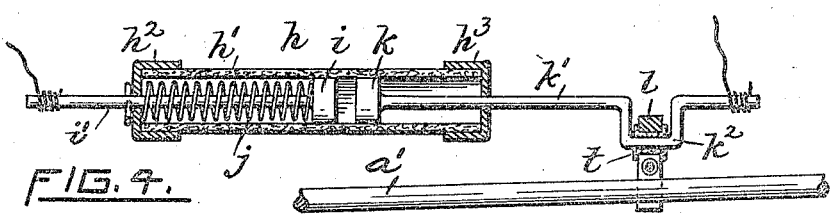
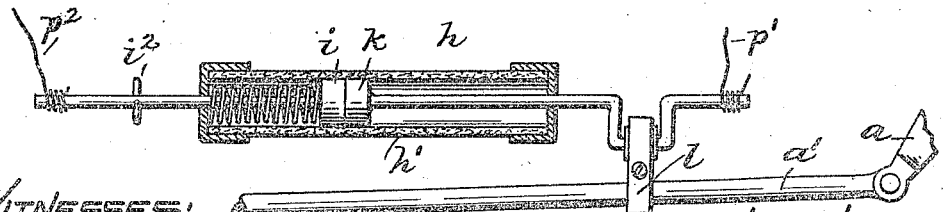

UNITED STATES PATENT OFFICE.

HARRISON F. GREENUP, OF PAWTUXET, RHODE ISLAND.

SAFETY-SIGNAL FOR AUTOMOBILES.

1,187,424.

Specification of Letters Patent. Patented June 13, 1916.

Application filed September 23, 1915. Serial No. 52,298.

*To all whom it may concern:*

Be it known that I, HARRISON F. GREENUP, a citizen of the United States, residing at Pawtuxet, in the county of Kent and State of Rhode Island, have invented certain new and useful Improvements in Safety-Signals for Automobiles, of which the following is a specification.

This invention relates to an improved means adapted to be mounted on automobiles for automatically illuminating a signal lamp carried at the rear thereof, at the time of making a turn or a slowing down of the car, in order to warn drivers of vehicles following and thereby to prevent rear end collision.

Heretofore it was the common practice for the driver of a car when slowing down to a stop or in making a turn, to throw out his hand as a warning sign to the driver of the car following, and such mode of warning often results in rear end collisions and thereby causing serious personal injury and damage to the cars.

The aim of my invention is to guard against such accidental encounter between the vehicles.

My invention consists of a signal lamp having electric connection with a controller, designed to be actuated by the usual presser-foot lever connection with the brake-rod of the car.

In the accompanying sheet of drawings, wherein like reference characters indicate like parts, Figure 1 is a partial side elevation of the chassis of an automobile, showing the application of my invention thereto. Fig. 2 is a central longitudinal section of the signal lamp. Fig. 3 is a front end view of the latter. Fig. 4 is a sectional elevation of the electric controller for the lamp, and illustrating its connection with the brake-rod of the car, in the relative position of parts as when the current is off the lamp. Fig. 5 is a similar view showing the position the parts assume to impart the signal by the lamp.

In the drawings —$a$— designates the presser-foot lever connection with the brake-rod —$a^1$—, which leads to the friction band surrounding the rear axle —$a^2$— of an automobile. On the rear of the chassis —$b$, $b^1$— is a signal lamp —$c$— which consists of a horizontal cylindrical case —$c^1$— having a rearwardly-extending cone-shaped portion —$c^2$— within which is mounted an electric illuminator —$d$—. The case —$c^1$— has its front end closed by a magnifying glass plate —$e$—, and intermediate the illuminator —$d$— and the said plate is a metallic disk —$f$— which is secured to the case and has its stock cut through to form the letters of the word "stop." The lamp is mounted on a suitable support —$g$— secured on the rear part —$b^1$— of the chassis. Beneath the chassis is located the controller —$h$—, which consists of the horizontal tube —$h^1$—, of fiber or other suitable material which is a non-conductor of electric current, and metal caps —$h^2$, $h^3$— are secured to and close the ends of said tube. A piston —$i$— is movable in one portion of the tube —$h^1$— and is fast on a rod —$i^1$— which passes through the cap —$h^2$—. An expanding coil spring —$j$— has its ends bearing against the cap —$h^2$— and piston —$i$—. The rod —$i^1$— has a pin —$i^2$—, to form a stop in limiting the extent of inward movement of the piston —$i$—. The tube —$h^1$— has also a secondary piston —$k$— fast on a rod —$k^1$— which passes through the cap —$h^3$—, and said rod has a forked-shaped part —$k^2$— made to receive a suitable clamp connection —$l$— with the brake-rod —$a^1$—. The illuminator —$c$— and pistons —$i$, $k$— receive electric current from a common storage battery, as —$n$—, carried by the car.

From the electrode of the illuminator —$d$— a wire —$p$— leads to a binding post at one end of the battery, and from a binding post at the other end of the battery a wire —$p^1$— leads therefrom and is connected to the free end of the piston-rod —$k^1$—. From the free end of the piston-rod —$i^1$— a wire —$p^2$— leads to the electrode of the illuminator —$d$—.

The controller —$h$— is mounted on supports —$s$— secured to and beneath the chassis —$b$—.

In order to prevent the current passing through the brake-rod —$a^1$— the bottom of the forked part of the piston-rod —$k^1$— is provided with a tubular member —$t$—, of suitable non-conductor material.

The pistons —$i$, $k$— are of metal capable of receiving a maximum amount of electric current, and normally these pistons are separated, as in the position of parts shown in Fig. 4.

When the driver of the car desires to give a warning signal to the rear he simply presses his foot against the lever —$a$—, to bring the latter to the position indicated by dotted lines in Fig. 1, thus throwing on the brake and simultaneously forcing the piston —k— into chargeable contact with the piston —i— and making lighting connection with the illuminator —d—.

In order to further increase the brilliancy of the signal word "stop," at the time of lighting, the interior of the wall of the case surrounding the illuminator —d— may be coated over with white enamel, as is obvious.

Having described my invention what I claim and desire to secure by Letters Patent, is—

In combination with the presser-foot connection with the brake-rod of an automobile, a lamp adapted to be mounted at the rear of the car and inclosing an integral disk whose stock is cut through to form a signal word, and said lamp having an illuminator back of the disk, a controller inclosing a spring-pressed piston and a stem connection from the latter, an electric wire leading from the stem of said piston to the illuminator, a secondary piston having a stem connection therefrom, a battery to maintain a constant current to the free end of the stem of said secondary piston and to the illuminator, means to secure the stem of said secondary piston to the brake-rod, whereby working action of the latter brings the said secondary piston into forcible contact with the said first mentioned piston and making electric circuit to illuminate the signal, substantially as set forth.

In testimony whereof I affix my signature in presence of two witnesses.

HARRISON F. GREENUP.

Witnesses:
DUNCAN W. ROSS,
PETER C. CANNON.